Feb. 13, 1962     E. B. HEDGEPETH     3,021,154
TRAILER HITCH
Filed July 31, 1959     2 Sheets-Sheet 1
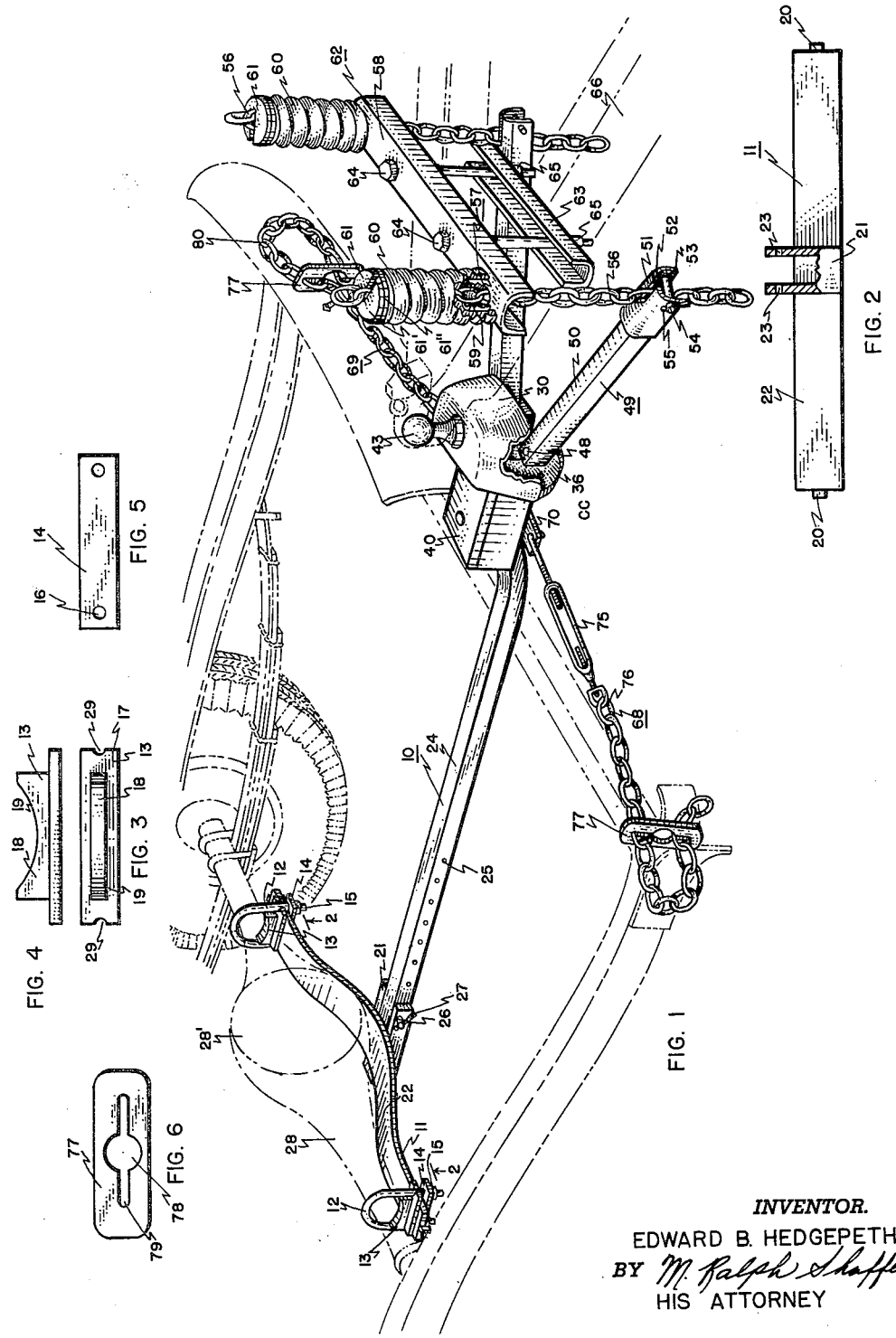
INVENTOR.
EDWARD B. HEDGEPETH
BY M. Ralph Shaffer
HIS ATTORNEY Feb. 13, 1962  E. B. HEDGEPETH  3,021,154
TRAILER HITCH
Filed July 31, 1959  2 Sheets-Sheet 2

INVENTOR.
EDWARD B. HEDGEPETH
BY M. Ralph Shaffer
HIS ATTORNEY

United States Patent Office 3,021,154
Patented Feb. 13, 1962

3,021,154
TRAILER HITCH
Edward B. Hedgepeth, 2819 St. Mary's Way,
Salt Lake City, Utah
Filed July 31, 1959, Ser. No. 830,798
3 Claims. (Cl. 280—406)

This invention relates to trailer hitches for motor vehicles and, more particularly, to a new and improved, automobile trailer hitch which is easy to install, couple and uncouple; and which connects to the rear axle of the automobile rather than rigidly attaching to the frame, dissipates road shock by virtue of the employment of a spring suspension connection to the trailer, in addition to the conventional, ball-and-socket joint, exhibits a neat appearance and high versatility, ensures maximum road clearance, and generally operates, as has been proven through actual road tests, in a manner much more satisfactory than is the case with hitches hitherto devised.

In the past a number of different types of hitches have been devised for installation on automobiles so that the same may be coupled to a house-trailer, for example. One type of hitch is welded or rigidly bolted to the automobile frame. This rigid connection to the frame has proven to be extremely undesirable since it results in twisting of the frame and excessive stress at frame-hitch junctures, prevents the differential of the automobile from operating properly, and results in a harder and more shaky ride, even though overload springs are used, through undesirable transmission of road shock to the automobile body and unwanted restriction of body oscillation (both of which overload springs would not affect).

Clearly, the best approach to the problem is to devise a hitch for connection, not to the body or frame, but to the rear axle of the vehicle so as to transmit the load thereto and thus leave the automobile body free to oscillate on its springs (which, by virtue of hitch connection to the axle, will not be loaded by the trailer). Hitches having means for connection to the rear axle of an automobile have been conceived previously; but existing hitches of this type exhibit restricted road clearance and, indeed, by the under-rigging thereof in the form of lateral, angulated stress rods, will scrape a wide area underneath the automobile when the same traverses a bumpy or rutted dirt road, for example.

An object of the present invention is to provide a hitch of the type described wherein the drawbar of the hitch is free to twist, is contoured appropriately, and is devoid of all lateral under-rigging, so as to ensure maximum road clearance or, certainly, minimum contact with even the roughest of roads.

Another object of the invention is to provide a hitch of the axle connection type wherein there is no rigid attachment to the body or frame of the automobile whatsoever, and wherein all of the load is transmitted by the hitch to the axles of the automobile and trailer.

Another object of the present invention is to provide a hitch wherein, in addition to the employment of the conventional, ball-and-socket joint, the hitch is attached to the trailer by a second connection employing shock dissipation springs, so that road shock due to trailer haulage is dissipated by these springs.

Another object of the invention is to provide stabilization in the drawbar, trailer connection (plus load transmission to the axles of automobile and trailer) by providing a novel hitch "head" to which lift levers may be pivotally attached and flexibly and springly connected to the trailer frame clamp of the hitch.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a perspective view of the trailer hitch of the present invention when the same is attached to the rear axle of a vehicle and to the frame of a trailer to be hauled, the vehicle and trailer frame being shown in phantom lines and in fragmentary view.

FIGURE 2 is a bottom view, taken along the line 2—2 in FIGURE 1, of the saddle plate of the hitch.

FIGURES 3 and 4 are plan and side elevations, respectively, of the axle clamp of the hitch.

FIGURE 5 is a plan view of the clamp plate of the hitch.

FIGURE 6 is a plan view of the slip-link lock employed with the lateral chains of the hitch.

Figure 7:
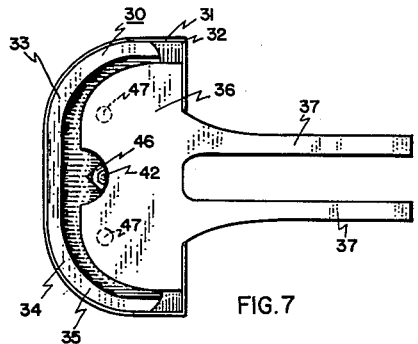
FIGURES 7, 8 and 9 are bottom, top and front views of the hitch head.
Figure 8:
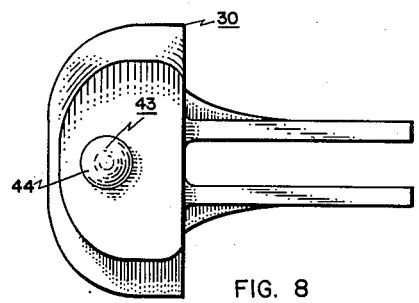

In FIGURES 1-6 the trailer hitch of the present invention is shown to consist in part of a drawbar 10, a saddle plate 11, a pair of U-bolts 12, a pair of axle clamps 13, a pair of clamp plates 14, and nuts 15 which serve the attachments for the U-bolts 12. FIGURE 5 illustrates that clamp plate 14 is provided with a pair of apertures 16 which accommodate the placement therewithin of the threaded legs of U-bolts 12. FIGURES 3 and 4 illustrate that the axle clamp 13 includes a base 17 and an upstanding clamping flange 18 the outer edge 19 of which is circularly concave so as to be able to provide a seat for the axle of the automobile. As is shown in FIGURE 2, saddle plate 11 includes a pair of end stops 20 at both ends thereof and also is supplied with a drawbar seat 21 at a medial region thereof which is secured to the plate member 22 of the welding. Preferably, the drawbar seat 21 takes the form of a U-configured channel which extends rearwardly of the saddle plate (see FIGURE 1) and underneath bell housing 28', being supplied at the rear region thereof with aligned apertures 23. Drawbar member 24 of drawbar 10 is supplied with a plurality of mutually spaced, corresponding apertures 25 a selected one of which is aligned with apertures 23 of the drawbar seat, cooperating therewith by means of pin 26 and cotter 27.

The saddle plate 11 is originally mounted to the vehicle axle in the manner shown in FIGURE 1, with the axle 28 being secured between U-bolts 12 and axle clamps 13 by the employment of clamp plates 14 and nut attachments 15. The axle clamps 13 cannot slip out of their position since their edges are provided with circular indentations 29 (see FIGURE 3) which cooperate with the interior leg edges of the U-bolts 12.

It is important to note that at this juncture that the hitch is rigidly secured to rear axle of the automobile by the clamp attachments (U-bolts 12, axle clamps 13, clamp plates 14 and nuts 15) heretofore mentioned. It is important that the nuts 15 be cinched up tightly so that there will exist a maximum degree of rigid retention of the hitch by the rear axle 28. (For some makes of automobiles it may be necessary to employ thin, shim strips between the two plates 14 and saddle plate 11 so as to relieve the bell housing 28').

It should be noted at this point and kept in mind throughout the entire description of the invention that the absence of rigid attachment to the vehicle frame results in the transmission of the entire load to the vehicle axle; this insures freedom of oscillation to the vehicle frame during travel thereof. Accordingly, the use of the hitch in no wise interferes with desired riding qualities of the automobile.

Figure 10:
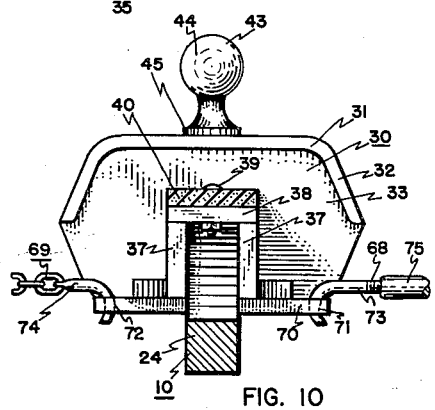
FIGURE 10 is a rear view of the hitch head when the same is secured as by welding to the drawbar of the hitch.
Figure 9:
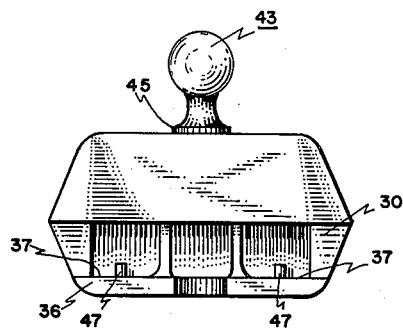
Figure 11:
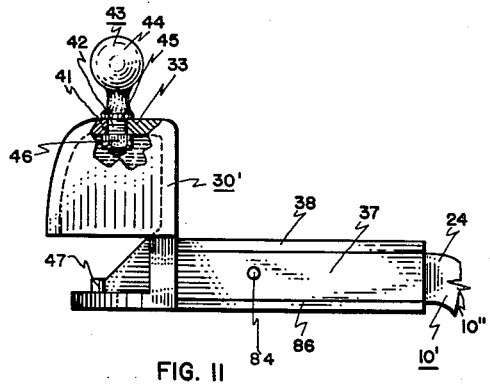
FIGURES 11 and 12 are views of a detachable type head, shown in side elevation and top plan, respectively.
Figure 12:
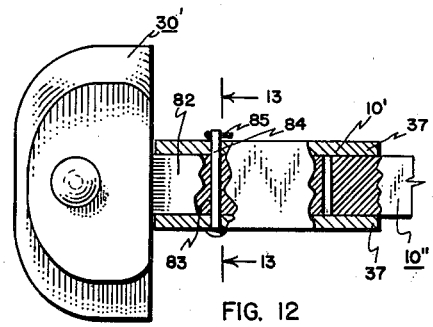
Figure 13:
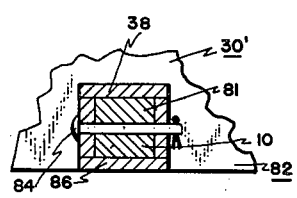
FIGURE 13 is a vertical section taken along line 13—13 in FIGURE 12, with the detachable head shown in fragmentary view.

FIGURES 7 through 10 illustrate one type of head 30 which may be employed in the hitch of FIGURE 1, whereas FIGURES 11, 12 and 13 illustrate a second type of head, of substantially the same character as the former, but being detachable in nature so that the same may be removed from the vehicle when trailer haulage is not in immediate contemplation. In FIGURES 7 through 10 the head 30 may have disposed thereover a thin, chrome-plated cover 31 for appearance purposes, the same being flanged at 32. Head 30 itself consists of a body 33 having a depending skirt 34 exhibiting an edge 35 (which constitutes a "lift surface"), a lower, horizontally extending flange 36 the upper surface 37 of which constitutes a "reaction surface," and a pair of forward extensions 37 which may contain therebetween the drawbar member 24 of drawbar 10 as shown in FIGURE 10. A plate 38 is welded to the upper surfaces of the extension 37, and bolted thereto by means of attachments 39 is a rubber bumper pad 40. The body 33 of head 30 includes an upper aperture 41 which is designed to receive the threaded shank 42 of ball member 43, the latter additionally including the conventional ball 44 and the mounting flange 45. Nut means 46 secure ball member 43 to the head in the manner illustrated in FIGURE 11.

It is to be noted that flange 36 includes a pair of upstanding pivot posts 47 which engage the bores 48 of lever rods 49. See FIGURE 1 in this connection. The bored bars 50 of levers 49 have secured their outermost ends chain-retaining channels 51 which are welded thereto and provided with chain slots 52 and also aligned apertures 53 for admitting therewithin the chain retainer pins 54. The latter are provided with cotter pins 55 as indicated. The chains 56 are retained in chain slots 52 at selected links thereof and pass through channel apertures 57 of the clamp upper channel member (constituting the upper clamp half) 58, and also through cylindrical positioners 59 welded to the upper channel, to proceed through compression shock springs 60 for retention by retainers 61. Retainers 61 may simply comprise two discs welded together, the upper disc 61' being radially slotted and the lower disc 61" having a washer configuration.

In addition to channel 58, the trailer frame clamp 62 is provided with a lower channel clamp (or lower clamp half) 63 and a pair of bolts and attachments 64 and 65, respectively, both of the channels being drilled for the reception of bolts 64.

In operation, the two channels 58 and 63 are faced as shown and clamped to the trailer frame 66 in the manner illustrated, with the ball joint being secured in the usual manner. This operation is of course performed while the front portion of the trailer frame is retained above the horizontal by the trailer jack. It is assumed that at this point the saddle plate 11 of the hitch has already been secured to axle 28 of the vehicle so that the head 30 of the hitch is in proximate relation with the front-end of the trailer frame. At this point the levers 49 are inserted between flange 36 and skirt 34 so as to engage the pivot posts 47. It is to be noted that at this juncture that the levers 49 are free to rotate about the pivot posts 47 during travel turns. The lower ends of chains 56 are inserted through the channel slotted ends 51 of levers 49 at selected lengths thereof (so that the chains are taut), and the retainer pins 54 inserted with the same being secured by cotter pins 55. When the trailer jack is lowered the front end of the trailer will of course press down upon ball joint 43 and increase the tension upon chains 56. But the levers 49 act against the reaction surface of the head and also liftingly engage the skirt 34 of head 30 so as to transmit the entire load to axle 28 of the automobile. In the load thus being transmitted there will result no twisting or other interaction with the body frame when the vehicle and trailer are in motion. This is in sharp contrast to existing trailer hitches where the hitch is rigidly attached to the vehicle frame.

Compression springs 60 operate as shock absorbers to take up road shock in such a manner as to relieve the tension on chains 56 and also to ensure that shock is not passed on to either the vehicle or the trailer. Thus, ride ease is ensured since hitch fastening is at the rear axle of the automobile and not directly to the frame proper, oscillation of the automobile body on its springs is restricted by hitch attachment, and the load is carried by the trailer and vehicle axles, with road shock being dissipated by the hitch coupling springs 60. It should be noted that at this juncture the centering chain units 68, 69 (shortly to be discussed) should be slack during travel.

Turning now to the chain unit of the attachment to drawbar 10 it will be seen with reference to FIGURES 1 and 10 that a chain retainer plate 70 is affixed at or near the juncture of drawbar member 24 and head 30 (to either the one or the other or both of these members). This securement will generally be performed by welding. The chain retainer plate 70 includes a pair of hook retaining apertures 71 and 72 which operate to retain the hook-configured turnbuckle bolt 73 and chain hook 74, respectively. The chain unit 68 shown in FIGURE 1 includes a turnbuckle 75, a chain length 76 and a slip-link type lock 77. Two of the latter secure the chain loops of both chain units around the frame of the automobile. Chain 76 is looped around the frame and retained to itself by the lock 77. The lock itself is illustrated in FIGURE 6 and is shown to include a central aperture 78 having diametrically disposed, chain link slots 79 continuous therewith. The remaining chain unit 69 merely includes a chain length 80, a lock 77 and the hook 74 of FIGURE 10 the attachment of which is illustrated in FIGURES 1 and 10.

It should be repeated again that the chain units 68 and 69 are for centering purposes only and should be in slack condition when the usual trailer (such as a house-trailer) is being hauled. The centering and also the travel-height regulating functions are performed by the chain units 68 and 69 when, during rough travel, the rearward end of the drawbar reaches its lowermost point of possible disposition (as limited by the lengths of the said chain units). Where very light trailers of the order of four or five hundred pounds or less are pulled, then it may well be that the clamp 62, compression springs 60, vertical chains 56 and levers 49 of FIGURE 1 will not be needed. In this event the turnbuckle 75 and slip-link locks 77 should be adjusted for centering of the drawbar and also to tighten the chains so as regulate the travel height of the rearward end thereof. But even in this condition the load is taken up primarily by the axle of the vehicle since the chain coupling is laterally flexible.

The hitch head 30' shown in FIGURES 11, 12 and 13 is substantially identical to head 30 of FIGURES 7 through 10 which has been discussed previously. The whole difference is that extensions 37 and top plate 38 are welded to drawbar member 10', and bottom plate 86 is secured to the undersides of extensions 37 so that the forward end of the drawbar 10" exhibits a box-like receiving aperture 81. This aperture is designed to receive the mounting stub 82 of head 30', the stub being drilled at 83 so as to provide admittance therethrough for retainer pin 84. Cotter pin 85 secures the head 30' to the box-configured end of drawbar 10' and thus making the head detachable from the drawbar. When the head is so detached, there will be no protrusion whatever of the hitch which will be open to view to the rear of the vehicle bumper.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. A trailer hitch including, in combination: a drawbar, means affixed to one end of said drawbar for securing the latter to the axle of a vehicle so that said drawbar extends from the center of said axle in a rearward direction; means affixed to the remaining end of said drawbar for providing a ball joint trailer connection, a lift surface, a reaction surface, and vertical pivot means; lever means pivotally mounted to said pivot means and contacting said lift and reaction surfaces; clamp means securable to the frame of a trailer to be pulled; and tension means connecting said lever means to said clamp means so as to supply force in an upward direction against said lift surface for all degrees of pivotal orientation of said lever means, and wherein said means affixed to one end of said drawbar comprises a saddle plate, means for rigidly affixing said saddle plate to the rear axle of a vehicle and beneath the bell housing thereof, said saddle plate including a drawbar channel seat rigidly secured on the underneath side and in a medial region thereof, said channel seat having a pair of aligned apertures, said drawbar having a plurality of length adjustment apertures dimensioned to communicate in turn with said seat apertures, and pin means securing said drawbar within said seat by said pin means engaging said apertures of said seat and a chosen one of said apertures of said drawbar.

2. A trailer hitch including, in combination: a drawbar, means affixed to one end of said drawbar for securing the latter to the axle of a vehicle so that said drawbar extends from the center of said axle in a rearward direction; means affixed to the remaining end of said drawbar for providing a ball joint trailer connection, a lift surface, a reaction surface, and vertical pivot means; lever means pivotally mounted to said pivot means and contacting said lift and reaction surfaces; clamp means securable to the frame of a trailer to be pulled; and tension means connecting said lever means to said clamp means so as to supply force in an upward direction against said lift surface for all degrees of pivotal orientation of said lever means, and wherein said clamp means securable to a trailer has an upper clamp member provided with a pair of end, chain receiving apertures and a pair of compression spring positioners circumscribing said chain receiving apertures, said chains passing upwardly through said chain receiving apertures, a pair of compression springs respectively circumscribing said chains above said upper clamp half and within their respective positioners, and a pair of chain retainers respectively affixed to said chains and disposed over the tops of said springs.

3. A coupling head for a trailer hitch including a body, a coupling ball affixed to and above said body, said body having an internally open, depending skirt and a horizontal flange disposed beneath said skirt and indented with respect thereto, pivot means upstanding from said horizontal flange beneath and inwardly of and spaced from said skirt, and lever means removably pivoted upon said pivot means and engaging said flange as reaction means and said skirt as a fulcrum.

References Cited in the file of this patent
UNITED STATES PATENTS

| | | |
|---|---|---|
| 1,507,651 | Young et al. | Sept. 9, 1924 |
| 1,527,722 | Wolf | Feb. 24, 1925 |
| 1,539,474 | Falk | May 26, 1925 |
| 2,255,624 | Luse | Sept. 9, 1941 |
| 2,474,296 | Wiltsee | June 28, 1949 |
| 2,692,148 | Bywater | Oct. 19, 1954 |
| 2,729,470 | Seitz | Jan. 3, 1956 |
| 2,817,542 | Wettstein | Dec. 24, 1957 |
| 2,828,143 | DaVatz | Mar. 25, 1958 |
| 2,846,237 | Martin | Aug. 5, 1958 |
| 2,952,475 | Reese | Sept. 13, 1960 |